May 11, 1965 W. H. SWAIN 3,183,455

AUTOMATICALLY STABILIZED OSCILLATOR CIRCUITS

Filed Aug. 25, 1960 2 Sheets-Sheet 1

William H. Swain
INVENTOR.

BY William R. Sherman

ATTORNEY

May 11, 1965 W. H. SWAIN 3,183,455

AUTOMATICALLY STABILIZED OSCILLATOR CIRCUITS

Filed Aug. 25, 1960 2 Sheets-Sheet 2

William H. Swain
INVENTOR.

BY William R. Sherman

ATTORNEY

United States Patent Office 3,183,455
Patented May 11, 1965

3,183,455
AUTOMATICALLY STABILIZED OSCILLATOR CIRCUITS

William H. Swain, Sarasota, Fla., assignor to Electro-Mechanical Research, Inc., Sarasota, Fla., a corporation of Connecticut
Filed Aug. 25, 1960, Ser. No. 51,937
8 Claims. (Cl. 332—18)

Figure 1:
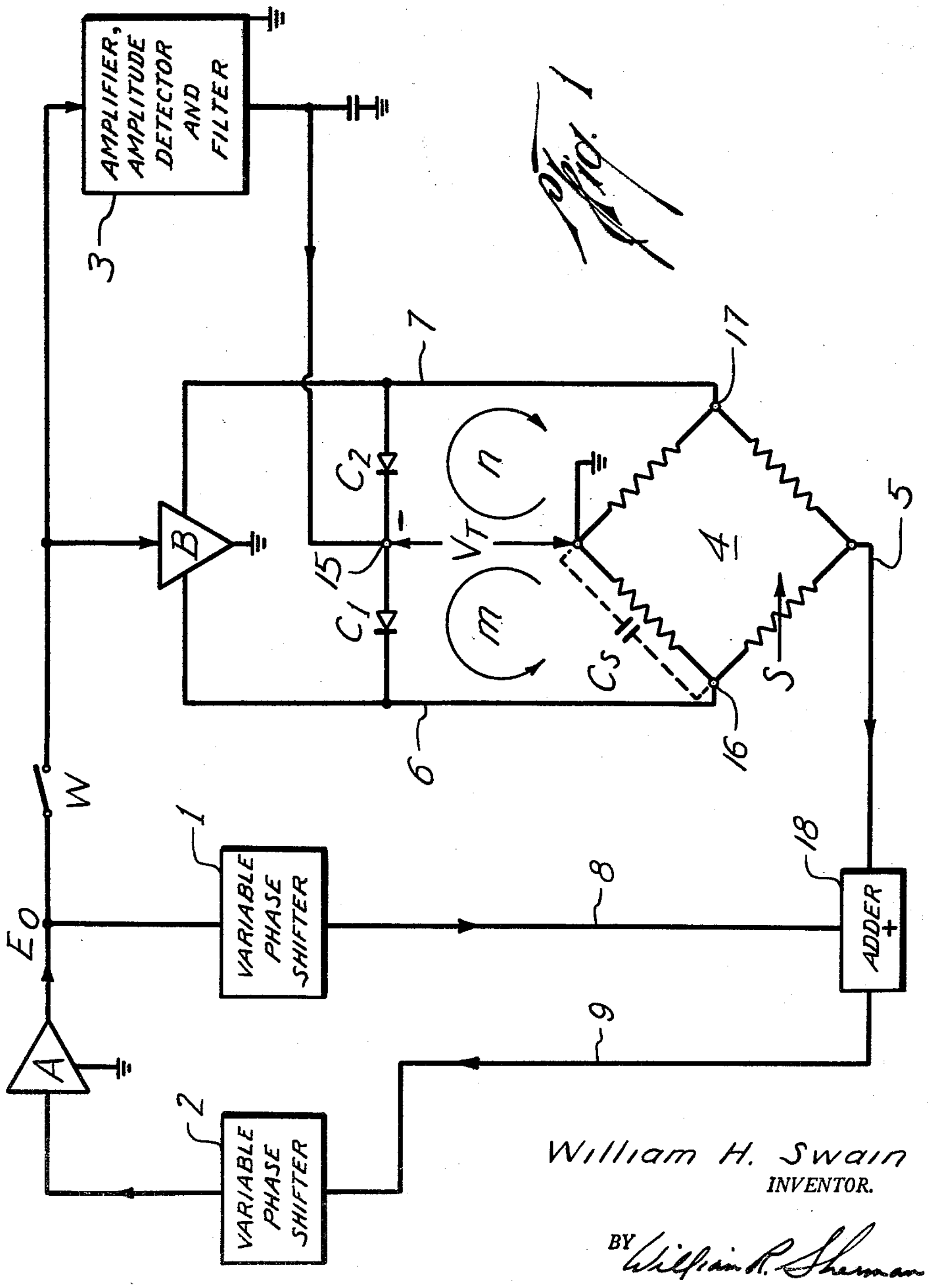

This invention relates to frequency modulated oscillators and more particularly to such oscillators having bridge networks as the frequency modulating means.

In conventional telemetering circuits for the detection of variations in physical phenomena, use is often made of resistive and reactive bridge networks. The output signal from the bridge is suitably applied to an oscillator in such a manner as to linearly change the frequency of the oscillator from its center frequency as a function of the amplitude of said signal. Thus, the amount and direction of frequency deviations are related to the change in the impedance of one of the arms of the bridge and, therefore, to the change in the physical phenomenon under test.

The method above-described is subject, however, to severe limitations since its utilization is limited to relatively low frequencies. This is primarily due to the fact that at higher frequencies, the variations in the stray capacitances, in and around the bridge and in the often long wires leading from the bridge arms to the oscillator, introduce error signals which are often larger than the "true" signals.

Several compensating circuits are known, the adaptation of which, however, requires numerous components and rather elaborate arrangements.

It is therefore the main object of this invention to provide simple and yet highly reliable means for automatically cancelling the effects of any reactive unbalanced impedances introduced in the bridge arms of frequency modulated oscillators.

A further object of this invention is to provide automatically stabilized bridge oscillator circuits especially well adapted for use at relatively high frequencies and in connection with the transmission of data from remote bridge networks.

A still further object of this invention is to provide means for removing amplitude modulations in a frequency modulated oscillator requiring a minimum of elements.

Another object of this invention is to provide means for automatically removing the error voltage from the output of a bridge modulator without changing the sensitivity of the oscillator circuit, thereby making the sensitivity substantially independent of stray capacitances.

These and other objects of the present invention are attained by providing an oscillator circuit including a feedback path therefor into which is coupled the output signal of the bridge network adapted to frequency modulate the oscillator circuit. Amplitude variations in the output of the oscillator resulting from undesired stray reactive impedances in the bridge network and from other causes are detected and the resulting voltage applied to the junction of a pair of reverse biased capacitive diodes, the capacitance of which varies inversely with the applied voltage, connected in series across the input circuit to the bridge. The two series connected diodes may perform a twofold function, that of automatically compensating for any unbalanced variations in the reactance value in any arm of the bridge, and that of providing an automatic gain control for the oscillator circuit.

Figure 2:
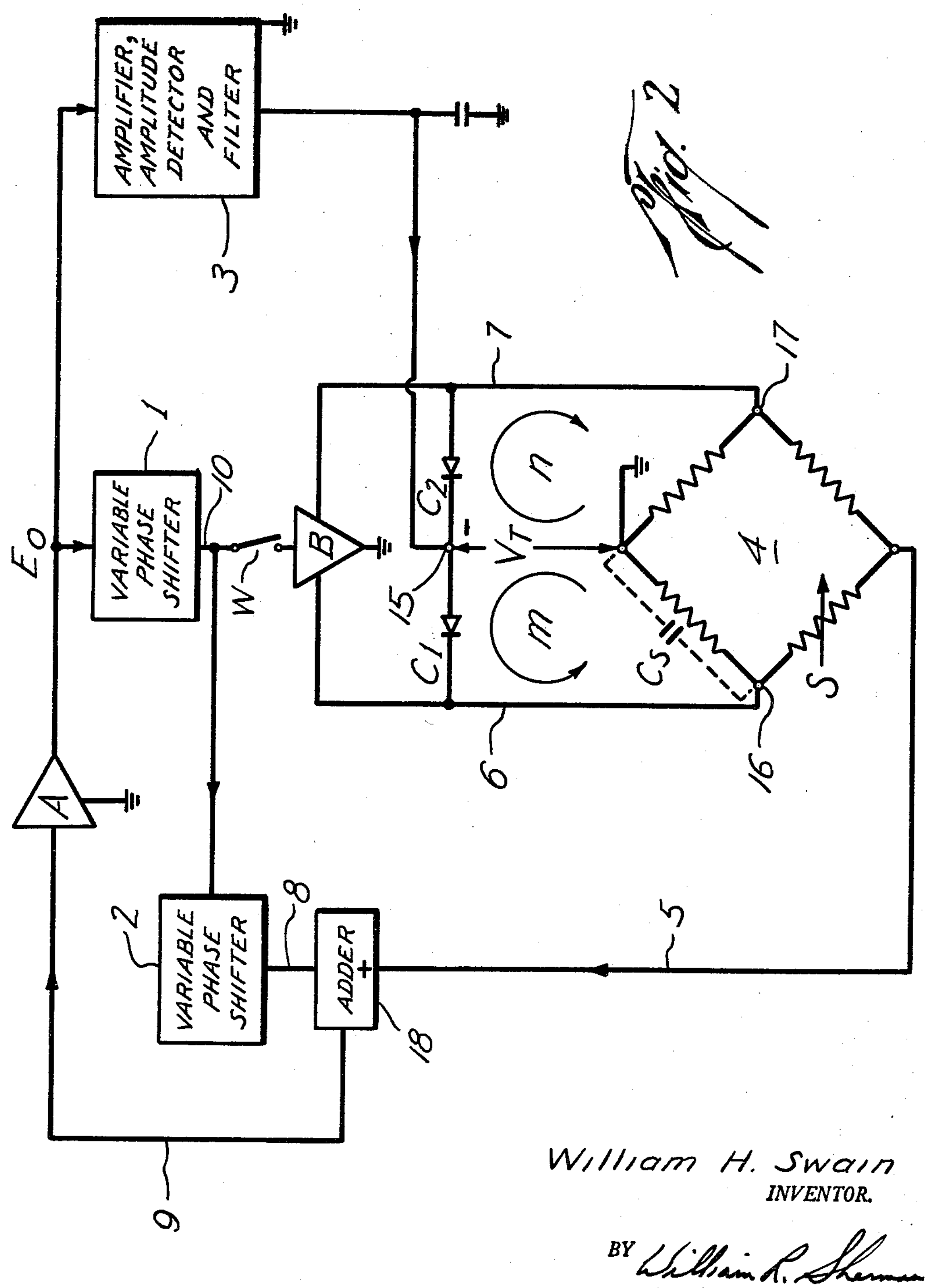

The invention will be more fully understood when considered in connection with the accompanying drawings in which:

FIG. 1 is a block diagram of a typical frequency modulated oscillator constructed in accordance with this invention; and FIG. 2 is a block diagram of a modification of the circuit illustrated in FIG. 1.

In FIG. 1, a portion of the output voltage $E_o$ from amplifier A is fed back to its input through variable phase shifters 1 and 2. It is well-known that for oscillations to occur, the total loop gain of amplifier A must be equal to unity and the net phase shift around the loop must be zero.

Output voltage $E_o$, which is taken herein as the reference voltage with no phase shift, is applied through switch W to the input of amplifier B providing a balanced output voltage to ground across lines 6 and 7 which are connected to diagonally opposite terminals 16 and 17 of bridge 4 which may be a strain gauge, one or more arms of which is subject to strain S. The output signal from bridge 4 is fed on line 5 to adder 18 which also receives on line 8 the output of phase shifter 1. The output of adder 18 is applied to the input of phase shifter 2.

When switch W is open, amplifier A will oscillate at an angular center frequency $w_o$ if phase shifters 1 and 2 will produce a net phase shift equal and opposite to the phase shift produced by A, and if the gain of the loop is equal to unity.

When W is closed, bridge 4 is driven by a voltage $V_{(6-7)}$ (the standard symbol $V_{(a-b)}$ will be used herein to denote the voltage V across lines "*a*" and "*b*," when "*b*" is at ground potential only $V_a$ will appear) which is in phase with $E_o$. Since the bridge arms are usually pure resistances, a change in S will produce a real signal $V_5$. Phase shifters 1 and 2 are adjusted to make $V_8$ reactive. Usually, the magnitude of $V_5$ is much smaller than the magnitude of $V_8$. Hence, $$V_9 = V_5 + JV_8 \doteq V_8 \angle \theta \quad (1)$$

It is well known that A will now begin to oscillate at a frequency $w$ different from $w_o$, so that the conditions for oscillation are again satisfied. Since the absolute value of $V_9$ in Equation 1 is very nearly equal to the absolute value of $V_8$, the amplitude of oscillations will not change, i.e., the oscillations will not be amplitude modulated with variations in S.

In practice, however, an unbalance in the stray capacitances across the strain gauge bridge arms will produce a quadrature voltage component $JX_5$ at the output of the strain gauge bridge. An unbalance of this sort is equivalent to a change in $JV_8$ and, hence, in the frequency shift produced by a given value of S, thus making the sensitivity of the oscillator a function of the stray capacitances.

Under these conditions:

$$V_9 = V_5 + J(V_8 + X_5) \doteq (V_8 + X_5) \angle \theta' \quad (2)$$

Hence, since $V_9$ is now a function of $X_5$ amplitude modulations will result and since $\theta'$ of Equation 2 is different than $\theta$ of Equation 1, frequency modulations will be generated in addition to those produced by S. Since a strain gauge whose frequency sensitivity is a function of unknown variable and often unpredictable stray capacitances is usually useless, several corrective circuits have been offered.

One of such keeps the magnitude of $V_9$ constant which is equivalent to maintaining $E_o$ constant by the known methods of automatic volume control. This, however, does not entirely cure the problem since attenuating $V_9$ (or $E_o$) when a capacitance unbalance occurs in the bridge means attenuating $V_5$ as well as $JV_8$ by proportionally the same amount; this results in an effective change in oscillator sensitivity.

Another method disclosed in U.S. Patent No. 2,923,-893, issued to R. A. Runyan and assigned to the same assignee, shows means for maintaining $J(V_8+X_5)$ constant, i.e., decreasing $V_8$ by the amount of $X_5$.

Although this method is entirely satisfactory in that it makes the sensitivity of the oscillator independent of stray capacitances, it has the disadvantage of requiring a relatively great number of components for achieving the desired result.

The method in accordance with this invention is much simpler and more direct since the thing which is eliminated is the spurious voltage itself from the point of origin, i.e., from the output of the bridge.

To this end, use is made of two diode transition capacitors $C_1$ and $C_2$ connected in series across lines 6 and 7. Their junction 15 is controlled by the amplified and amplitude detected output voltage $E_o$ in such a manner as to compensate for externally applied bridge capacity unbalance.

Diodes suitable for this purpose should preferably have the following characteristics:

(1) A large area P-N junction since transition capacity increases nearly linearly with junction area;

(2) Silicon diodes are particularly suitable since their resistance leakages are low at a relatively high temperature, such as 100° C.;

(3) The P-N junctions should be heavily doped since transition capacity increases as the square root of the minority carrier density in the least heavily doped section. Heavily doped junctions generally have a low avalanche voltage and high conductance at high current levels in the forward direction.

(4) The diodes should have a high Q and low leakage current at the operating frequency.

The transition capacity of a P-N junction diode, for example, is the significant capacity of the diode when it is biased near zero or in the reverse sense. This capacity decreases with an increase in the reverse bias and, conversely, the transition capacity increases with a decrease in the reverse bias. A reverse bias condition exists when the P section is biased more negative than the N section. The transition capacity is in general an inverse function of a fractional power of the applied voltage. A more detailed analysis may be found in Hunter "Handbook of Semiconductor Electronics," section 4–25, and Equation 4–51 in particular.

It was shown above, that a capacity unbalance produces in a bridge driven by a "real" voltage, i.e., in phase with $E_o$, a reactive component $JX_5$ which, when added to $JV_8$, produces amplitude and frequency modulation in the oscillator circuit. Thus, $E_o$ is frequency modulated by strain S and, in addition, amplitude and frequency modulated by $JX_5$. The magnitude of the A-M modulations which are rectified and filtered by A-M detector 3 appears as a D.-C. control voltage $V_T$ at junction 15.

A bridge capacity unbalance can be represented as a capacity across one arm of the bridge, as shown by $C_S$ in dotted lines.

Since $C_1$ and $C_2$ are low or reverse biased and since the magnitude of $V_T$ is usually not great enough to produce a significant forward current, there is no appreciable D.-C. current flowing in loops *m* and *n*. When $C_S$ appears as shown, the polarity of $V_T$ is negative to ground, thereby decreasing the magnitude of the reverse bias on $C_2$ and conversely increasing the reverse bias on $C_1$.

It should be noted that the resistance in each of the arms of a strain gauge bridge is usually around 100 ohms; therefore, $V_T$ will appear entirely across $C_1$ and $C_2$ since the resistance of $C_1$ and $C_2$ is very high, often 1000 megohms.

Since the decrease in the reverse bias on $C_2$ increases the capacity of $C_2$ and since the increase in the reverse bias on $C_1$ decreases the capacity of $C_1$, the bridge capacity becomes again balanced. It should be noted that junction 15 is at A.-C. ground potential, thus making $C_1$ and $C_2$ effectively in parallel for alternating currents. The decrease in the capacity of $C_1$ can be made nearly equal to $C_S/2$ and the increase in $C_2$ can also be made nearly equal to $C_S/2$, thus maintaining the capacity balance of the bridge. The bridge being restored to the original capacitance balance condition, the quadrature voltage $JX_5$ disappears, thereby removing the A-M and F-M modulations originally caused by the introduction of the stray capacity $C_S$.

Another important feature of this invention lies in the fact that the same circuit which is used to control the capacitance balance can also be used as the automatic gain control (AGC) element of amplifier A since the circuit regulates output level by effectively adjusting real loop gain.

The invention is not limited to any particular oscillator arrangement. In FIG. 2 is shown a circuit generally similar to the one illustrated in FIG. 1 except that the bridge driving voltage is reactive instead of being resistive; the same numerals are used to better bring out the analogy.

Phase shifters 1 and 2 are adjusted to make $V_{10}$ in quadrature with $E_o$. Therefore, a reactive voltage in phase with $V_{10}$ drives bridge 4 when switch W is closed. If the bridge is balanced, its output voltage $V_5$ is purely reactive. A relatively large resistive voltage $V_8$ is added to $JV_5$ in adder 18 making:

$$V_9=V_8+JV_5\doteq V_8\angle\theta \qquad (4)$$

The amplifier will change its operating frequency as a function of $\theta$ and, therefore, of S which produced $\theta$. Since $V_9\doteq V_8$ in the presence or in the absence of S, no amplitude modulations result. However, if an unbalanced stray capacitance $C_S$ appears across one arm, the output of the bridge, since it is driven by a quadrature voltage, will now have a real voltage component $X_5$. Equation 4 now becomes:

$$V_9=(V_8+X_5)+JV_5\doteq(V_8+X_5)\angle\theta' \qquad (5)$$

and $V_9$ is no longer equal to $V_8$ as in the case where no $C_S$ existed. The change in the magnitude of $V_9$ causes a change in the amplitude and in the frequency of $E_o$. The amplitude modulations are detected by A-M detector 3; the output D.-C. control voltage $V_T$ is again applied to junction 15. $V_T$ causes $C_1$ to decrease and $C_2$ to increase thereby making the net capacitance in loop *m* equal to the capacitance in loop *n*. As a result, $X_5$ disappears automatically, thus eliminating the undesirable A-M and F-M modulations and making the sensitivity of the oscillator independent of variable or constant stray capacitances.

Although the invention was described with particular reference to two diodes, it should be clear to those skilled in the art that one diode or more than two diodes may be utilized in various series or parallel combinations. For example, one diode could be connected across one arm of the bridge. Without the diode the bridge is unbalanced and with the diode it is balanced. A control voltage as $V_T$ is connected to one terminal of the diode. When a stray capacitance $C_S$ appears across one arm of the bridge, the control voltage $V_T$ will change the diode's capacitance in such a manner as to restore the capacitance balance of the bridge.

As the invention is susceptible to these and other modifications, it will be understood that the embodiments described above are not to be regarded as limiting the scope of the following claims.

What is claimed is:

1. A measuring system including: a tunable signal source for providing a carrier frequency, a bridge circuit energized by said carrier frequency to yield an output signal representing impedance variations in at least one of its arms, said output signal including a component signal corresponding to the bridge circuit's unbalanced stray capacitances; means coupling said bridge circuit with said source to tune the same in correspondence with said output signal, amplitude detecting means for deriving an error signal representing amplitude variations existing in said carrier frequency, and a variable impedance network coupled to said bridge circuit adapted to receive said error signal, the impedance value of said network changing in response to said error signal by an amount sufficient to substantially cancel said component signal from said output signal.

2. A system comprising: a tunable signal source for providing a carrier frequency, a first variable impedance network energized by said carrier frequency to yield an output signal representing impedance variations thereof, said output signal including an in-phase component signal corresponding to changes in the resistive value of said first impedance, and a quadrature component signal corresponding to changes in the reactive value of said first impedance; means tunably coupling said output signal with said source, amplitude detecting means for deriving an error signal representing amplitude variations existing in said carrier frequency, and a second variable impedance network coupled to said first impedance network and adapted to receive said error signal, the impedance value of said second network changing in response to said error signal by an amount sufficient to substantially cancel said quadrature component signal from said output signal.

3. A measuring system comprising: a bridge circuit including at least one variable impedance in one of its arms, a variable frequency source providing a carrier frequency for energizing said bridge circuit, said carrier frequency varying as a function of the output signal from said bridge circuit; amplitude detecting means providing a control signal as a function of the amplitude variations existing in said carrier frequency, and a variable reactance network coupled to said bridge circuit for receiving said control signal thereby substantially eliminating the effect of stray capacitances upon said output signal.

4. A system comprising: a tunable frequency source providing a carrier frequency, a condition-responsive impedance network energized by said carrier frequency for producing an output signal in correspondence with the network's impedance variations, means coupling said output signal with said source to tune the same in proportion to said impedance variations, amplitude detecting means providing an error signal in dependence upon the amplitude variations on said carrier frequency caused by unbalanced stray capacitances in said condition-responsive impedance network; and a control circuit, coupled to said network, adapted to receive said error signal and to change its impedance value by an amount sufficient to substantially eliminate the effect of said stray capacitances on said carrier frequency.

5. A measuring system comprising: a bridge circuit producing an output signal representing impedance variations in at least one of its arms, a variable frequency source producing a carrier frequency which is frequency modulated by said output signal, amplitude detecting means coupled to said source to derive an error signal representing amplitude variations on said carrier frequency, and a variable reactance network connected to said bridge circuit, the reactance value of said network varying as a function of said error signal.

6. In a frequency modulating system having a variable frequency oscillator whose carrier frequency is varied in accordance with the variations in the impedance values of a sensing element; a Wheatstone bridge network, including said sensing element in one of its arms, energized by said oscillator to provide an output signal; means coupling said output signal to said oscillator to vary the frequency thereof, variable reactance means connected across the energized terminals of said bridge network; means coupled to said oscillator for detecting amplitude modulations existing on said carrier frequency and for providing a control signal as a function of said amplitude modulations; and means coupling said control signal to said variable reactance means to change its reactive value by an amount sufficient to render said output signal substantially independent of stray capacitance variations in said bridge network.

7. A measuring system comprising: a Wheatstone bridge circuit having input and output terminals, a carrier frequency signal source coupled to said input terminals, means coupling said output terminals to said source, a variable reactance network connected across said input terminals, amplitude detecting means coupled to said source for detecting changes in the amplitude of the carrier frequency and for providing a control signal, and means for applying said control signal to said reactance network thereby changing its reactive value in dependence upon the amplitude changes on said carrier frequency.

8. A system comprising: a tunable signal source for providing a carrier frequency, a bridge circuit energized by said carrier frequency to yield an output signal representing impedance variations in at least one of its arms, said output signal including a resistive component corresponding to changes in the resistive value of said bridge circuit, and a reactive component corresponding to changes in the reactive value of said bridge circuit; means tunably coupling said output signal with said source, amplitude detecting means for deriving an error signal representing amplitude variations on said carrier frequency, and a variable impedance network coupled to said bridge circuit and adapted to receive said error signal, the impedance value of said network changing in response to said error signal by an amount sufficient to substantially cancel said reactive component from said output signal of said bridge circuit.

References Cited by the Examiner

UNITED STATES PATENTS

| | | | |
|---|---|---|---|
| Re. 25,256 | 10/62 | Schweitzer | 332—30 |
| 2,924,967 | 2/60 | Gieseler | 332—47 |
| 2,956,234 | 10/60 | Olsen | 332—47 |
| 3,050,693 | 8/62 | Sinninger | 332—30 |

FOREIGN PATENTS

| | | |
|---|---|---|
| 759,573 | 10/56 | Great Britain. |

ROY LAKE, *Primary Examiner.*

L. MILLER ANDRUS, ARTHUR GAUSS, *Examiners.*